(12) United States Patent
Ishigaki

(10) Patent No.: US 6,678,534 B2
(45) Date of Patent: Jan. 13, 2004

(54) MOBILE TELEPHONE WITH BACK LIGHT FUNCTION

(75) Inventor: Junji Ishigaki, Hachioji (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 470 days.

(21) Appl. No.: 09/792,601

(22) Filed: Feb. 23, 2001

(65) Prior Publication Data
US 2001/0027123 A1 Oct. 4, 2001

(30) Foreign Application Priority Data
Feb. 25, 2000 (JP) ................... P. 2000-050193

(51) Int. Cl.[7] .............................................. H04M 1/00
(52) U.S. Cl. ...................................................... 455/556
(58) Field of Search ......................................... 455/566

(56) References Cited
U.S. PATENT DOCUMENTS
2001/0027123 A1 * 10/2001 Ishigaki ..................... 455/566

FOREIGN PATENT DOCUMENTS

| EP | 0 951 036 A2 | 3/1999 |
| EP | 1128642 * | 8/2001 |
| JP | 6-120864 | 4/1994 |
| JP | 11-284712 | 10/1999 |

* cited by examiner

Primary Examiner—William Cumming
(74) Attorney, Agent, or Firm—Pearne & Gordon LLP

(57) ABSTRACT

When any application can be operated, a control section first indexes a table for defining validness or invalidness of an operating key corresponding to an application in a memory. Then, if the control section detects that any key is operated, the control section starts to turn ON a back light. Thereafter, the control section detects that any key is manipulated again before a lighting time set by a timer elapses, and it is decided whether the operation section is a valid key. If the valid key is operated, a first back light for illuminating the most neighboring part of the valid key and a second back light for illuminating a display section are continuously turned ON until the lighting time set by the timer of the control section elapses. However, if the lighting time set by the timer of the control section elapses, the back light is turned OFF.

11 Claims, 5 Drawing Sheets

FIG.4

| APPLICATION | TEN-KEY | NAVIGATION KEY |
|---|---|---|
| SITE RETRIEVAL | INVALID<br>※ VALID WITH A CHARACTER INPUT | A DIRECTION SCROLL KEY IS VALID AND A SELECTION AND DETERMINATION KEY IS INVALID<br>※ VALID WITH A CHARACTER INPUT |
| GAME | 2,4,6 AND 8 OF TEN KEYS ARE VALID AND OTHERS ARE INVALID | VALID |
| ELECTRONIC MAIL (i-MODE MAIL) RETRIEVAL | INVALID | A DIRECTION SCROLL KEY IS VALID AND A SELECTION AND DETERMINATION KEY IS VALID |
|  |  |  |

MOBILE TELEPHONE WITH BACK LIGHT FUNCTION

BACKGROUND OF THE INVENTION

The present invention relates to a mobile telephone having a back light function for: illuminating ten-key and a functional operation keys, including a navigation key for carrying out at least a vertical or transverse direction scroll and a selecting and determining operation, in an operation section and a display section; and serving to turn OFF a lighting back light after ten-key input or a key operation for a function operation is completed and a constant time elapses. More particularly, the mobile phone of the present invention has such a structure that only a back light in a necessary portion is turned ON according to an application to be operated so that an operation time of an internal battery is prolonged.

Conventionally, a mobile telephone having a back light function and serving to reduce power consumption through a back light as much as possible has been known in Japanese Publication Nos. Hei. 6-120864 and 11-284712.

For example, in Japanese Publication No. Hei. 6-120864, a plurality of light emitting diodes constituting a back light are provided and the power consumption of a battery is reduced in a power saving mode for turning OFF a half of the light emitting diodes in addition to a full lighting mode of a light emitting diode.

In Japanese Publication No. Hei. 11-284712, moreover, a back light key for carrying out the ON/OFF operation of a back light is provided in a housing section and the back light can be turned OFF by the OFF operation of a back light key, thereby preventing wasteful power consumption.

In Japanese Publication No. Hei. 6-120864, however, the conditions of a power saving mode for turning OFF half of a full lighting mode of a light emitting diode should be set and input by an owner, which is complicated. In Japanese Publication No. Hei. 11-284712, moreover, the housing section is provided with the back light key for turning ON/OFF the back light. Therefore, the back light key should be operated manually for back light control, which is complicated.

SUMMARY OF THE INVENTION

The invention has been made to solve such problems and has an object to provide a mobile telephone in which only a back light in a necessary portion is turned ON according to an application to be operated such as a non-voice information communicating mode, a voice information communicating mode or a game, thereby prolonging an operation time of an internal battery.

A first aspect of the invention is directed to a mobile telephone having a back light function for illuminating a ten-key and a functional operation keys in an operation section and a display section, causing the functional operation key to include a navigation key for carrying out at least a vertical or transverse direction scroll and a selecting and determining operation, and serving to turn OFF a lighting back light after a ten-key input or a key operation for a function operation is completed and a constant time elapses, wherein when a valid key and an invalid key are allocated to the navigation key and the ten-key corresponding to an application to be operated and the valid key is operated, only a first back light for illuminating the most neighboring part of the valid key and a second back light for illuminating the display section are turned ON. By such a structure, it is possible to prolong an operation time of an internal battery.

A second aspect of the invention is directed to the mobile telephone according to the first aspect of the invention, wherein a key for scrolling in the navigation key and a plurality of ten-keys to be used for dialing are allocated as the valid key corresponding to the application. By such a structure, the back light is turned ON for the operation of the valid key. Therefore, it is possible to prolong an operation time of an internal battery.

A third aspect of the invention is directed to the mobile telephone according to the second aspect of the invention, wherein a game is provided as the application, and the navigation key and the ten-keys to be used for dialing are allocated as the valid keys corresponding to contents of the game. By such a structure, a part of the ten-keys are operated as the valid keys in the manipulation of the game and the back light is turned ON for the operation of the valid key. Therefore, it is possible to prolong an operation time of an internal battery.

A fourth aspect of the invention is directed to a mobile telephone having a back light function for illuminating a ten-key and a functional operation key in an operation section and a display section, causing the functional operation key to include a navigation key for carrying out at least a vertical or transverse direction scroll and a selecting and determining operation, and serving to turn OFF a lighting back light after a ten-key input or a key operation for a function operation is completed and a constant time elapses, wherein when an application to be operated in a non-voice information communicating mode is site retrieval and a key for scrolling in the navigation key is operated, only a second back light for illuminating the display section is turned ON. By such a structure, in the case in which only the direction scroll in the navigation key is operated, only the back light in the display section is turned ON. Therefore, it is possible to prolong an operation time of an internal battery.

A fifth aspect of the invention is directed to a mobile telephone having a back light function for illuminating a ten-key and a functional operation key in an operation section and a display section, causing the functional operation key to include a navigation key for carrying out at least a vertical or transverse direction scroll and a selecting and determining operation, and serving to turn OFF a lighting back light after a ten-key input or a key operation for a function operation is completed and a constant time elapses, wherein a table for previously allocating a valid key and an invalid key to the navigation key and the ten-key is provided corresponding to an application to be operated, and furthermore, a valid/invalid key set operation section for indexing and setting the table is provided in the key operation section and is manipulated to previously allocate the valid key and the invalid key to be operated, and when the valid key is operated, only a first back light for illuminating the most neighboring part of the valid key and a second back light for illuminating the display section are turned ON. By such a structure, it is possible to prolong an operation time of an internal battery.

A sixth aspect of the invention is directed to the mobile telephone according to the first or fifth aspect of the invention, wherein the application is to be operated in a non-voice information communicating mode. By such a structure, the back light is turned ON for the operation of the valid key in the application in the non-voice information communicating mode. Therefore, it is possible to prolong an operation time of an internal battery.

A seventh aspect of the invention is directed to the mobile telephone according to the first aspect of the invention, the mobile telephone having a back light function for illuminating a ten-key and a functional operation key in an operation section and a display section, causing the functional operation key to include a navigation key for carrying out at least a vertical or transverse direction scroll and a selecting and determining operation, and serving to turn OFF a lighting back light after a ten-key input or a key operation for a function operation is completed and a constant time elapses, wherein when the ten-key or the functional operation key is operated, it is decided whether the key operation is the valid key or the invalid key, and if it is decided that the key operation is the valid key, only the first back light for illuminating the most neighboring part of the valid key and the second back light for illuminating the display section are turned ON. By such a structure, it is possible to prolong an operation time of an internal battery.

BRIEF DESCRIPTION OF THE DRAWINGS

FIG. 4 shows an example of a table for defining validness or invalidness of a ten-key and a navigation key corresponding to the application.

DETAILED DESCRIPTION OF THE PREFERRED EMBODIMENT

Embodiments of the invention will be described below with reference to FIGS. 1 to 5.

First Embodiment

Figure 1:
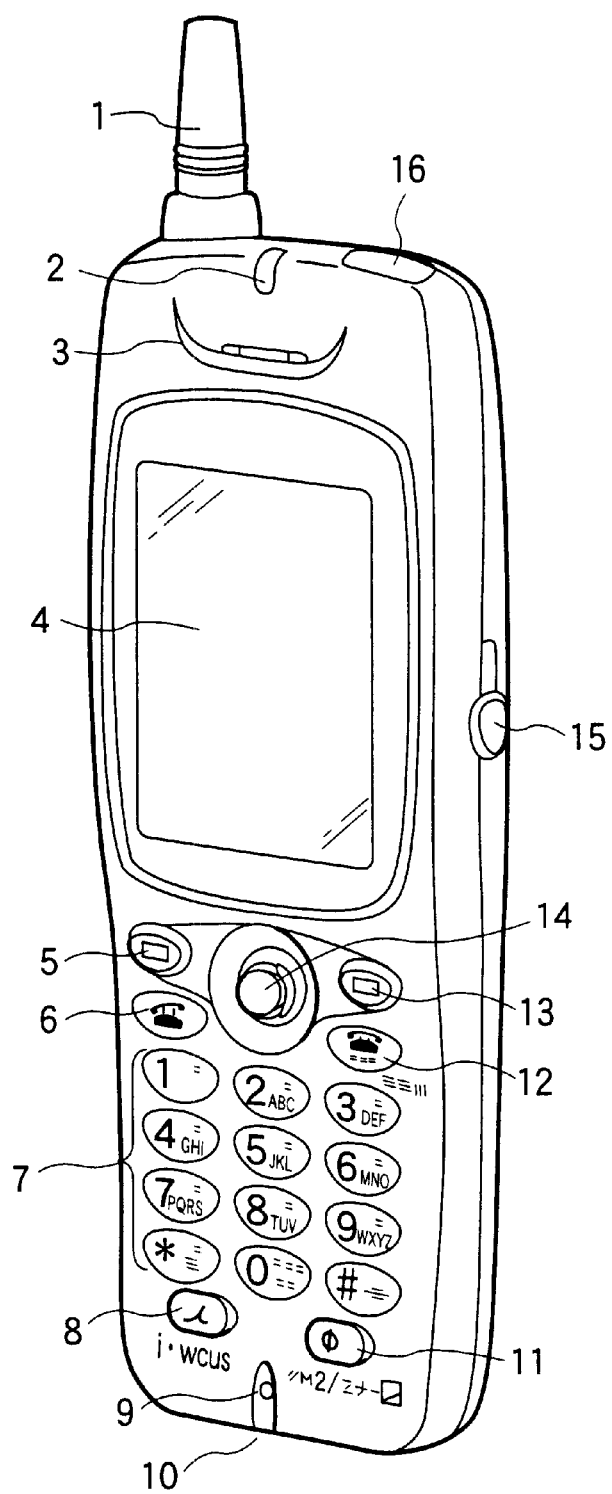
FIG. 1 is a front view showing the structure of a mobile telephone according to an embodiment of the invention.

FIG. 1 is a schematic diagram showing the structure of a mobile telephone according to an embodiment of the invention, for example, a mobile telephone comprising a non-voice information communicating mode (i-mode function). In FIG. 1, the mobile telephone according to the embodiment of the invention comprises an antenna 1, an incoming/charging lamp 2, a receiver 3, a liquid crystal display 4, a left soft key 5 also serving as a telephone directory button, a calling start button 6, a ten-key or a dial key 7, an i-warp key 8 capable of displaying a site (program) registered in a non-voice information communicating mode (i-mode function), a transmitter 9, an external connecting terminal 10, a voice/manner key 11, a power/end/response holding key 12, a right soft key 13 also serving as a redial/clear button, a navigation key 14 also having a scroll function to select display in each of vertical and transverse directions and serving to carrying out selection and determination by pushing a central button, an earphone microphone terminal 15, and an infrared port 16. The non-voice information communicating mode implies an operation mode for an online data service using a digital mobile telephone, and can utilize a site (program) connection service registered on a center, an internet connection service, a message service and an electronic mail (i-mode mail).

Figure 2:
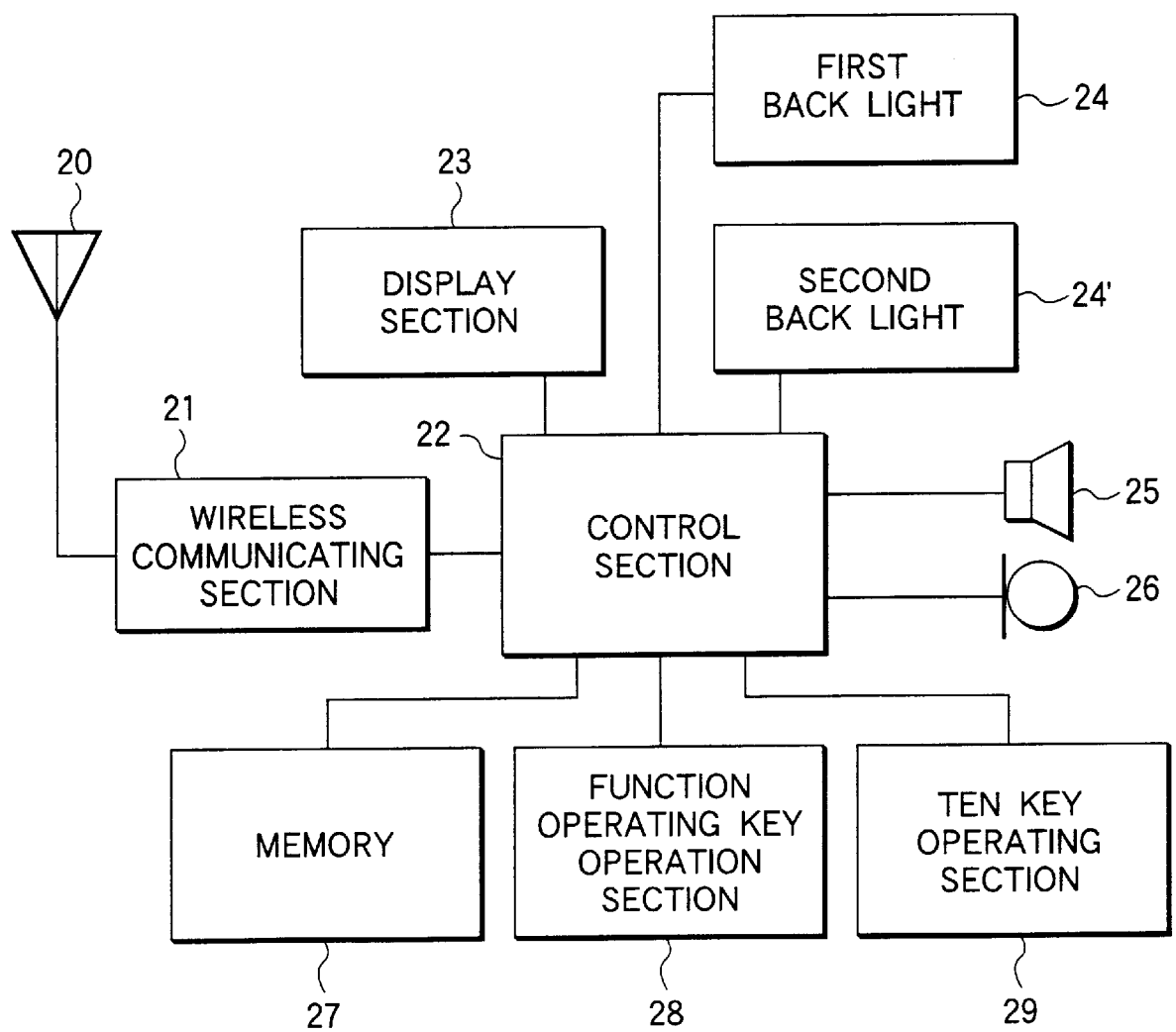
FIG. 2 is a diagram showing a circuit block for implementing the mobile telephone illustrated in FIG. 1.

FIG. 2 shows a circuit block for implementing a mobile telephone having the above-mentioned structure. The mobile telephone shown in FIG. 2 receives radio waves by a receiving section (not shown) of a wireless communicating section 21 through an antenna 20 and the wireless communicating section 21 transmits the received information to a control section 22. The control section 22 displays the received information such as a caller's number on a display section 23 such as a liquid crystal display. Moreover, the control section 22 converts the received information into voice information and outputs a voice through a speaker (receiver) 25 in a receiving section. Furthermore, a transmitter (microphone) 26 receives a user's voice and transmits the voice to the control section 22 and carries out wireless transmission to a calling party through a transmitting section (not shown) of the wireless communicating section 21 and the antenna 20. The control section 22 stores, in a memory 27, voice information such as the contents of calling during the calling or reads the stored information.

A ten-key operation section 29 serves to input a dial signal to the control section 22 through the operation of the ten-key, and a functional operation key operation section 28 serves to input the operation of the navigation key to the control section 22, for example. When the ten-key and the functional operation keys are operated in a calling mode, a first back light 24 and a second back light 24' are turned ON so that the key operation becomes clear. In the invention, however, only the back light in a necessary portion is turned ON according to an application to be operated such as a non-voice information communicating mode so that an operation time of an internal battery is prolonged. This respect will be described below in detail. These circuit blocks are accommodated in a housing shown in FIG. 1.

Figure 3:
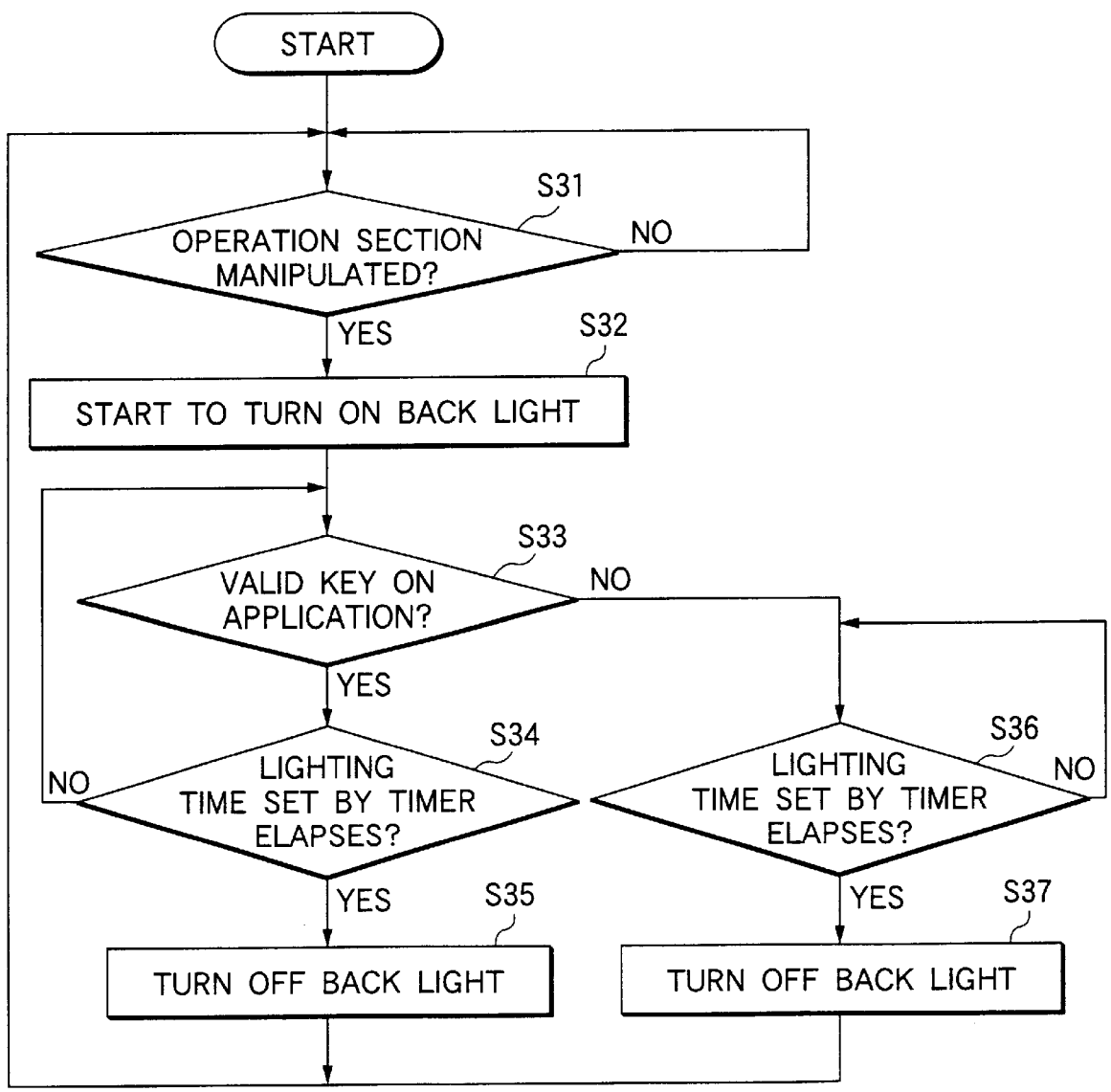
FIG. 3 is a flow chart according to a first embodiment for explaining an operation for controlling ON/OFF of a back light according to an application to be operated.

FIG. 3 is a flow chart according to a first embodiment for explaining an operation for controlling ON/OFF of the first and second back lights according to an application to be operated. In FIGS. 3 and 2, in the case in which the control section 22 detects that either of the operation sections 28 and 29 is manipulated to operate any application (Step 31), the control section 22 starts to turn ON the first back light 24 and the second back light 24' (Step 32)Next, the control section 22 indexes a table for defining validness or invalidness of the operating key corresponding to the application in the memory 27, and detects that either of the operation sections 28 and 29 is operated again before a lighting time set by a timer of the control section 22 elapses, and decides whether or not the operation section 28 or 29 is a valid key (Step 33).

If the valid key is operated, the first back light 24 for illuminating the most neighboring part of the valid key and the second back light 24' for illuminating the display section are continuously turned ON until the lighting time set by the timer of the control section 22 elapses (Step 34). If the valid key is consecutively pushed before the time set by the timer elapses, the timer is reset so that the first back light 24 for illuminating the most neighboring part of the valid key and the second back light 24' for illuminating the display section are continuously turned ON.

However, if the lighting time set by the timer of the control section 22 elapses, the first back light 24 and the second back light 24' are turned OFF (Step 35).

On the other hand, if the valid key is not operated at the Step 33, the first back light 24 started to be turned ON at the Step 32 and the second back light 24' for illuminating the display section are continuously turned ON until the lighting time set by the timer of the control section 22 elapses even if an invalid key is operated (Step 36). However, if the lighting time set by the timer of the control section 22 elapses, the first back light 24 and the second back light 24' are turned OFF (Step 37).

FIG. 4 shows an example of a table for defining validness or invalidness of a ten-key and a navigation key corresponding to an application provided in the memory 27. For example, in an application of site retrieval in the non-voice information communicating mode (i-mode), a vertical and transverse direction scroll of the navigation key is valid, and the selection and determination of the navigation key is defined to be invalid and that of the ten-key is defined to be invalid. In the case in which a character is to be input in the middle of the application, the invalidness is changed to the validness. Accordingly, even if the ten-key is operated in the application, the back light is not turned ON. Therefore, it is possible to prevent the operation time of the internal battery from being reduced.

In a game application, moreover, dialing keys 2, 4, 6 and 8 in the ten-key are defined to be valid because they are allocated to the operating keys of a game, other dialing keys are defined to be invalid and a functional operation key is defined to be valid. Accordingly, even if the dialing key in the ten-key is operated, only the operation of the dialing key related to the game application is turned ON. Therefore, it is possible to prolong the operation time of the internal battery.

The key operation section is provided with a valid/invalid key set operation section for indexing and setting a table for previously allocating a valid key and an invalid key to the navigation key and the ten-key corresponding to an application to be operated. By manipulating the valid/invalid key set operation section, the operation can also be carried out by previously allocating the valid key and the invalid key.

Second Embodiment

Figure 5:
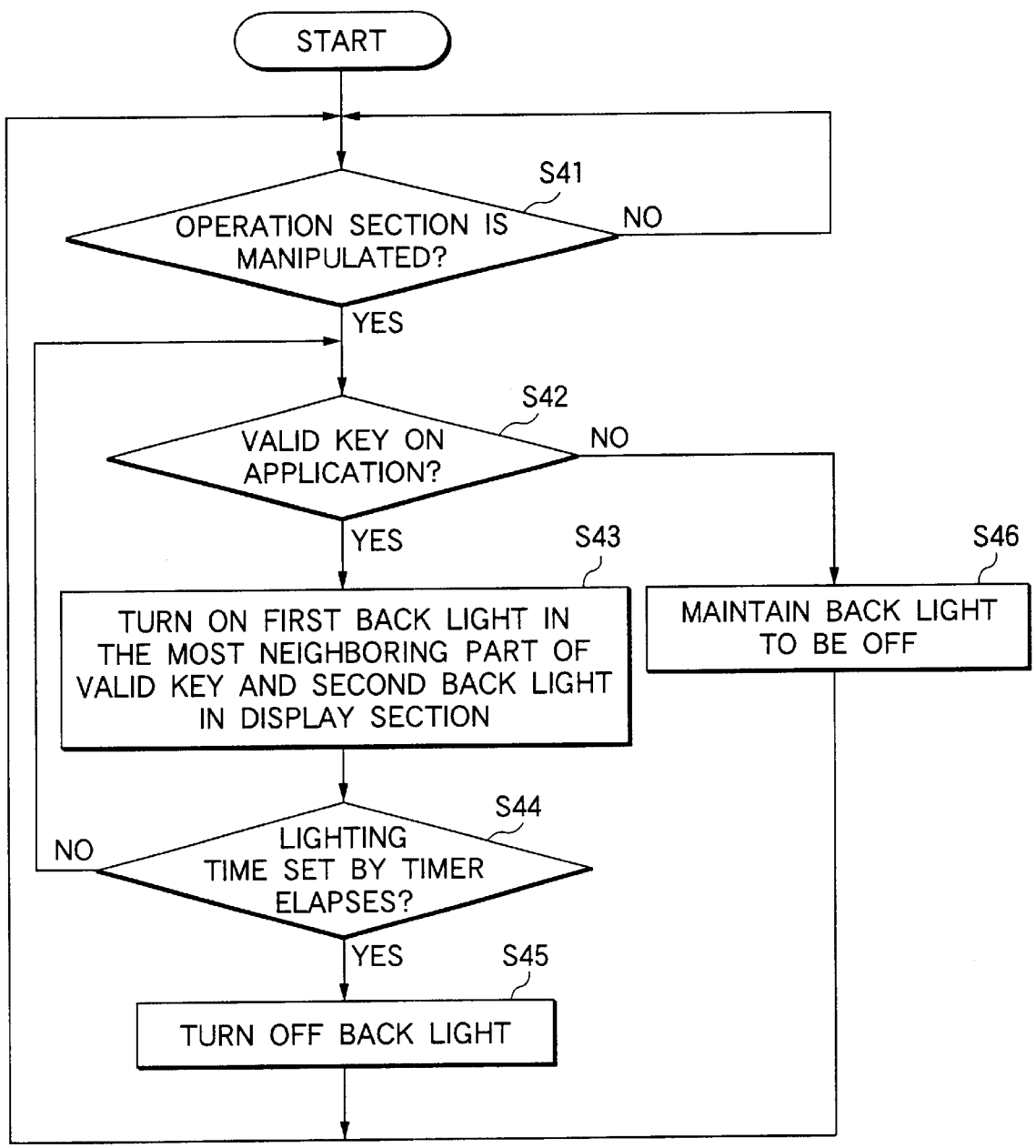
FIG. 5 is a flow chart according to a second embodiment for explaining an operation for controlling ON/OFF of a back light according to an application to be operated.

Next, an operation according to a second embodiment of the invention will be described with reference to a flow chart shown in FIG. 5. While the first back light 24 and the second back light 24' are turned ON when it is detected that either of the operation sections 28 and 29 is manipulated in the first embodiment (see Step 32 in FIG. 3), it is decided whether an operated key is a valid key or an invalid key (Step 42) when an operation section is manipulated (Step 41) in the second embodiment of the invention. If the operated key is the valid key, a first back light 24 for illuminating the most neighboring part of the valid key and a second back light 24' for illuminating a display section are turned ON (Step 43).

Then, if a lighting time set by a timer elapses (Step 44), the first back light 24 and the second back light 24' are turned OFF (Step 45) If the valid key is consecutively pushed before the lighting time set by the timer elapses, the timer is reset so that the first back light 24 and the second back light 24' are continuously turned ON. When it is decided that the operating key is the invalid key at the Step 42, the back light is not turned ON.

According to the second embodiment, thus, there is an advantage that lighting can be carried out within such a range as to correspond to an application after the operation is started.

As described above, according to the first aspect of the invention, a mobile telephone has a back light function for illuminating a display section and a ten-key and a functional operation key in an operation section, causes the functional operation key to include a navigation key for carrying out a vertical and transverse direction scroll and a selecting and determining operation through at least one key device, and serves to turn OFF a lighting back light after a ten-key input or a key operation for a function operation is completed and a constant time elapses, wherein when a valid key and an invalid key are allocated to the navigation key and the ten-key corresponding to an application to be operated in a non-voice information communicating mode and the valid key is operated, only a first back light for illuminating the most neighboring part of the valid key and a second back light for illuminating the display section are turned ON and a first back light for illuminating the most neighboring part of the invalid key and a back light for illuminating the display section are not turned ON. By such a structure, there is an advantage that an operation time of an internal battery can be prolonged.

According to the second aspect of the invention, in the mobile telephone according to the first aspect of the invention, a key for scrolling in the vertical and transverse directions of the navigation key and a plurality of ten-key to be used for dialing are allocated as the valid key corresponding to the application. By such a structure, the back light is turned ON for the operation of the valid key. Therefore, there is an advantage that an operation time of an internal battery can be prolonged.

According to the third aspect of the invention, in the mobile telephone according to the second aspect of the invention, a game is provided as the application, and the navigation key and the ten-keys to be used for dialing are allocated as the valid keys corresponding to contents of the game. By such a structure, apart of the ten-keys are also operated as the valid keys in the operation of the game and the back light is turned ON for the operation of the valid key. Therefore, there is an advantage that an operation time of an internal battery can be prolonged.

According to the fourth aspect of the invention, a mobile telephone has a back light function for illuminating a ten-key and a functional operation key in an operation section and a display section, causes the functional operation key to include a navigation key for carrying out at least a vertical or transverse direction scroll and a selecting and determining operation, and serves to turn OFF a lighting back light after a ten-key input or a key operation for a function operation is completed and a constant time elapses, wherein when an application to be operated in a non-voice information communicating mode is site retrieval and a key for scrolling in the navigation key is operated, only a second back light for illuminating the display section is turned ON. By such a structure, in the case in which only the direction scroll in the navigation key is operated, only the back light in the display section is turned ON. Therefore, there is an advantage that an operation time of an internal battery can be prolonged.

According to the fifth aspect of the invention, a mobile telephone has a back light function for illuminating a ten-key and a functional operation key in an operation section and a display section, causes the functional operation key to include a navigation key for carrying out at least a vertical or transverse direction scroll and a selecting and determining operation, and serves to turn OFF a lighting back light after a ten-key input or a key operation for a function operation is completed and a constant time elapses, wherein a table for previously allocating a valid key and an invalid key to the navigation key and the ten-key is provided corresponding to an application to be operated, and furthermore, a valid/invalid key set operation section for indexing and setting the table is provided in the key operation section and is manipulated to previously allocate the valid key and the invalid key to be operated, and when the valid key is operated, only a first back light for illuminating the most neighboring part of the valid key and a second back light for illuminating the display section are turned ON. By such a structure, there is an advantage that an operation time of an internal battery can be prolonged.

According to the sixth aspect of the invention, in the mobile telephone according to the first or fifth aspect of the invention, the application is to be operated in a non-voice information communicating mode. By such a structure, the back light is turned ON for the operation of the valid key in the application in the non-voice information communicating mode. Therefore, there is an advantage that an operation time of an internal battery can be prolonged.

According to the seventh aspect of the invention, the mobile telephone according to the first aspect of the invention has a back light function for illuminating a ten-key and a functional operation key in an operation section and a display section, causes the functional operation key to include a navigation key for carrying out at least a vertical or transverse direction scroll and a selecting and determining operation, and serves to turn OFF a lighting back light after a ten-key input or a key operation for a function operation is completed and a constant time elapses, wherein when the ten-key or the functional operation key is operated, it is decided whether the key operation is the valid key or the invalid key, and if it is decided that the key operation is the valid key, only the first back light for illuminating the most neighboring part of the valid key and the second back light for illuminating the display section are turned ON. By such a structure, there is an advantage that an operation time of an internal battery can be prolonged.

What is claimed is:

1. A mobile telephone having a back light function for illuminating a key provided in an operation section and a display section, and serving to turn OFF a lighting back light when a constant time elapsed after a key operation is completed, the mobile telephone comprising:

an allocating section for allocating a valid key and an invalid key to the key in the operation section corresponding to an application to be operated;

a first back light which illuminates the most neighboring part of the valid key; and a second back light which illuminates the display, wherein the first back light and the second back light are turned ON when the valid key is operated.

2. A mobile telephone according to claim 1, wherein the key in operation section having a ten-key and a functional operation key including a navigation key for carrying out at least a vertical or transverse direction scroll and a selecting and determining operation, wherein the valid key and the invalid key is allocated to the navigation key and the ten-key.

3. A mobile telephone according to claim 2, wherein a key for scrolling in the navigation key and a plurality of the ten-keys to be used for dialing are allocated as the valid key corresponding to the application.

4. A mobile telephone according to claim 3, wherein a game is provided as the application, and the navigation key and the ten-key to be used for dialing are allocated as the valid keys corresponding to contents of the game.

5. A mobile telephone according to claim 1, wherein the application is operated in a non-voice information communicating mode.

6. A mobile telephone having a back light function for illuminating a ten-key and an functional operation key including a navigation key for carrying out at least a vertical or transverse direction scroll and a selecting and determining operation provided in an operation section and a display section, and serving to turn OFF a lighting back light when a constant time elapsed after a key operation is completed, the mobile telephone comprising:

a first back light which illuminate the ten-key and the functional operation key including the navigation key; and a second back light which illuminate the display section, wherein only the second back light is turned ON when an application operated in a non-voice information communicating mode is site retrieval and a key for scrolling in the navigation key is operated.

7. A mobile telephone having a back light function for illuminating keys in an operation section and a display section, and serving to turn OFF a back light when a constant time elapses after the input or operation of keys is completed, comprising:

a table for previously allocating a valid key and an invalid key to the keys in the operation section provided corresponding to an application to be operated;

a valid/invalid key set operation section for indexing and setting the table provided in the key operation section;

a first backlight for illuminating the keys; and a second backlight for illuminating the display, wherein the first backlight and the second backlight are tuned ON when the valid key is operated.

8. A mobile telephone according to claim 7, wherein the application is to be operated in a non-voice information communicating mode.

9. A mobile telephone having a back light function for illuminating a key provided in an operation section and a display section, and serving to turn OFF a lighting back light when a constant time elapsed after a key operation is completed, the mobile telephone comprising:

a determination section which determines, when the key is operated, whether the operated key is a valid key or a invalid key;

a first back light which illuminates the most neighboring part of the valid key; and a second back light which illuminates the display, wherein the first back light and the second back light are turned ON when the determination section determines that the operated key is the valid key.

10. A mobile telephone according to claim 9, wherein the key in operation section having a ten-key and a functional operation key including a navigation key for carrying out at least a vertical or transverse direction scroll and a selecting and determining operation.

11. A mobile telephone according to claim 9, wherein the valid key and the invalid key is decided in accordance with an application to be operated, wherein the application is operated in a non-voice information communicating mode.

* * * * *